(12) United States Patent
Suh

(10) Patent No.: US 6,473,148 B1
(45) Date of Patent: Oct. 29, 2002

(54) SEAL PATTERN FOR LIQUID CRYSTAL DEVICE

(75) Inventor: Seong Woo Suh, Pikesville, MD (US)

(73) Assignee: Yafo Networks, Inc., Hanover, MD (US)

( * ) Notice: Subject to any disclaimer, the term of this patent is extended or adjusted under 35 U.S.C. 154(b) by 56 days.

(21) Appl. No.: 09/724,982

(22) Filed: Nov. 28, 2000

(51) Int. Cl.⁷ .............................................. G02F 1/1335
(52) U.S. Cl. .................................................... 349/153
(58) Field of Search ................................. 349/153, 156, 349/190

(56) References Cited

U.S. PATENT DOCUMENTS

| | | |
|---|---|---|
| 3,990,781 A | 11/1976 | Gum |
| 3,990,782 A | 11/1976 | Yamasaki |
| 4,050,786 A | 9/1977 | Feldman |
| 4,135,789 A | 1/1979 | Hall |
| 4,655,547 A | 4/1987 | Heritage et al. |
| 4,695,490 A | 9/1987 | McClelland et al. |
| 4,715,686 A | 12/1987 | Iwashita et al. |
| 5,108,332 A | 4/1992 | Brosgi |
| 5,111,321 A * | 5/1992 | Patel .......................... 349/198 |
| 5,276,541 A | 1/1994 | Terada et al. |
| 5,335,103 A | 8/1994 | Kim |
| 5,410,423 A | 4/1995 | Furushima et al. |
| 5,477,361 A | 12/1995 | Yanagi et al. |
| 5,481,388 A | 1/1996 | Aoya |
| 5,557,436 A | 9/1996 | Blose et al. |
| 5,566,013 A | 10/1996 | Suzuki et al. |
| 5,619,358 A | 4/1997 | Tanaka et al. |
| 5,691,793 A | 11/1997 | Watanabe et al. |
| 5,706,069 A | 1/1998 | Hermens et al. |
| 5,724,110 A | 3/1998 | Majima |
| 5,828,435 A | 10/1998 | Kato et al. |
| 5,898,041 A | 4/1999 | Yamada et al. |
| 6,001,203 A | 12/1999 | Yamada et al. |
| 6,005,653 A | 12/1999 | Matsuzawa |
| 6,013,339 A | 1/2000 | Yamada et al. |
| 6,078,379 A | 6/2000 | Nagae et al. |
| 6,104,457 A | 8/2000 | Izumi et al. |
| 6,137,559 A | 10/2000 | Tanaka et al. |
| 6,208,402 B1 * | 3/2001 | Tajima ........................ 349/156 |
| 6,222,603 B1 | 4/2001 | Sakai et al. |

FOREIGN PATENT DOCUMENTS

JP         5-173150      *  7/1993    ................. 349/153

* cited by examiner

Primary Examiner—James Dudek
(74) Attorney, Agent, or Firm—Brett Alten

(57) ABSTRACT

A seal pattern formed on a substrate of a liquid crystal device (LCD) is provided. The seal pattern at least includes a primary seal pattern that substantially surrounds the active area of the LCD and a dummy seal pattern that is formed at least partially inside the primary seal pattern. The dummy seal pattern can be formed substantially around one or more active areas of the LCD. The dummy seal pattern includes a plurality of discontinuous seal portions. Methods for making an LCD with the seal pattern according to this invention are also provided.

18 Claims, 4 Drawing Sheets

SEAL PATTERN FOR LIQUID CRYSTAL DEVICE

FIELD OF THE INVENTION

The present invention relates to a seal pattern in a liquid crystal device ("LCD"), and more particularly to a dummy seal pattern in a LCD for use within a fiber optical device.

BACKGROUND OF THE INVENTION

LCDs are widely used in a broad range of consumer electronics and display systems. A conventional LCD includes an upper substrate having a common electrode, a lower substrate having pixel electrodes, thin film transistors, metal wiring, and other well-known components for activating the pixel electrodes, a seal pattern that seals the upper and lower substrates with a predetermined gap therebetween, and a liquid crystal material that fills the gap.

FIG. 1 is a plan view of conventional LCD 10. Active area 12 is formed in a central region of substrate 14. The elements necessary for operation of LCD 10 are provided on active area 12 of LCD 10. Primary seal pattern 16 is also formed on lower or upper substrate 14 and substantially surrounds around active area 12. Typically, seal pattern 16 is disposed at a predetermined distance from active area 12.

Liquid crystal injection port 18 is formed through seal pattern 16. End seal 19 seals injection port 18. Seal bar 17 can be formed between liquid crystal injection port 18 and active area 12 and prevents end seal 19 from penetrating into the interior of seal pattern 16. Seal pattern 16, seal bar 17, and end seal 19 have a predetermined height that corresponds to the gap between the upper and lower substrates and can be formed from an adhesive insulating epoxy or any other appropriate bonding material. The bonding material can also include a plurality of spherical spacers for helping to ensure a uniform gap between the upper and lower substrates.

LCD 10 can be constructed by bonding an upper substrate (not shown) having a common electrode to lower substrate 14 via seal pattern 16 and/or seal bar 17. After the substrates are bonded together, a vacuum is normally applied in the gap formed between the upper and lower substrates and within seal pattern 16. Once a vacuum is formed, a liquid crystal material is normally injected into the gap through injection port 18. After injection, liquid crystal injection port 18 is typically sealed with end seal 19.

Foreign matter, such as dirt, chemical residues, and other contaminants, can destroy the integrity of seal pattern 16 and diminish the quality of the LCD. The foreign matter can be deposited on seal pattern 16 or on the inner surfaces of the upper and lower substrates when the gap formed between the substrates is under vacuum.

FIG. 2 shows LCD 10 after additional outer seal pattern 15 has been added to prevent the effects of broken seals. Outer seal pattern 15 surrounds inner seal pattern 16 and generally follows the shape of seal pattern 16. The presence of second seal pattern 15 prevents the liquid crystal material from leaking when the seal of first seal pattern 16 is broken. Therefore, the distance between first seal pattern 16 and second seal pattern 15 is normally chosen to be sufficiently large such that if first seal pattern 16 is broken, such as when pressure is applied to the upper substrate during the bonding process, second seal pattern 15 does not also break.

Although double sealed systems are less fragile than single seal systems, these LCD are still susceptible to breakage and warping.

FIG. 3 shows a side cross-sectional view of another conventional LCD 20. LCD 20 includes upper substrate 21 and lower substrate 22, which are bonded together using seal pattern 24. During cell construction, seal pattern 24 is provided on one of the substrates and spacer 26, which includes a plurality of particles, is provided on the other substrate. The two substrates are then normally attached to each other and liquid crystal material 28 is injected therebetween. The presence of spacer 26 during attachment, however, expels liquid crystal material 28 and creates localized defects about the individual spacer particles, which typically have a diameter on the order of about tens of microns. When the LCD is used as a display device, the defects do not significantly degrade the performance of the LCD system because the defects are relatively small and undetectable by a naked human eye.

When the LCD is used in other applications, however, such as along the optical path of a fiber optic system, the presence of the spacer particles in the optical path can significantly degrade the performance of the system. For example, the diameter of a core of a single mode fiber can be less than 10 microns. Also, when a beam of light exits such a fiber, a collimated beam can be formed that has a diameter of approximately 400 microns. In either case, the presence of defects in the LCD caused by spacers in the optical path can significantly alter the intensity and polarization state of the propagating light, such as by scattering the incident light.

It would therefore be desirable to provide one or more clear optical paths through an LCD having a uniform gap.

It would also be desirable to provide an LCD that includes a minimum number of localized defects and provides a clear optical path for use with fiber optic systems.

It would further be desirable to provide an LCD in which the liquid crystal material is uniformly distributed in the LCD's active area.

SUMMARY OF THE INVENTION

It is therefore an object of this invention to provide one or more clear optical paths through an LCD having a uniform gap.

It is also an object of the present invention to provide an LCD that includes minimum number of localized defects and provides a clear optical path for use with fiber optic systems.

It is a further object of the present invention to provide an LCD in which the liquid crystal material is uniformly distributed in the LCD's active area.

In accordance with this invention, an LCD is provided that has a seal pattern formed between the substrates of a liquid crystal device is provided. The seal pattern can include: (1) a primary seal pattern that substantially surrounds the active area and (2) a dummy seal pattern formed at least partially inside the primary seal pattern.

The dummy seal pattern includes a plurality of discontinuous seal portions. These seal portions can be disposed on the substrate in the form of one or more lines, or randomly in any desirable pattern. The seal portions can also have the same or varying sizes, shapes, and orientations.

A fiber optic device that includes an LCD having a dummy seal pattern is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 4:
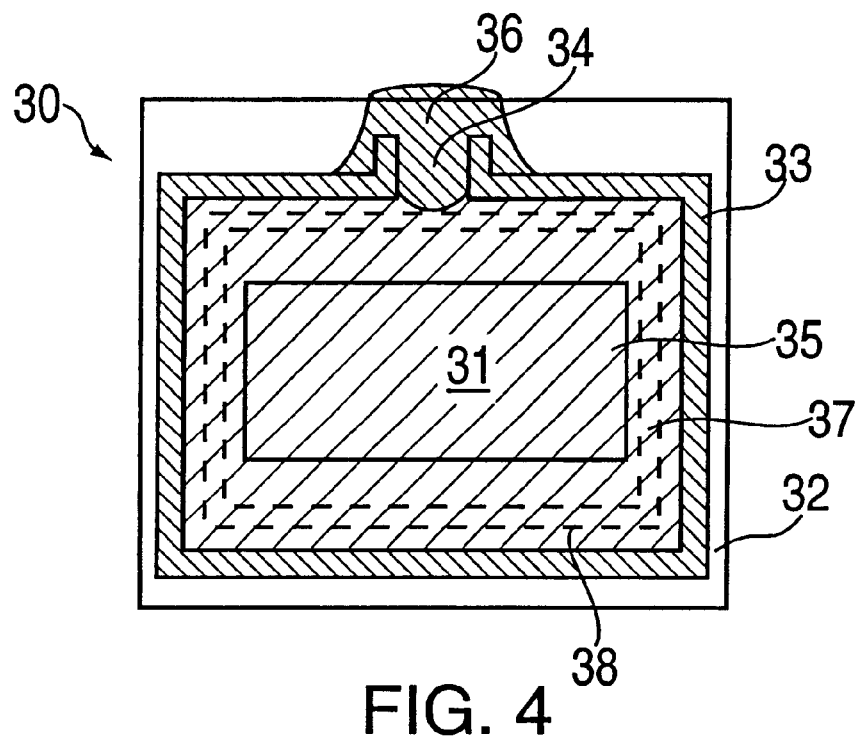
FIG. 4 is a plan view of a seal pattern of an LCD according to the present invention.

FIG. 4 is a planar view of an illustrative embodiment of an LCD constructed according to the present invention. LCD 30 includes active area 31. Primary seal pattern 33 is formed on upper and/or lower substrate 32 and can substantially surrounds active area 31 or can have any convenient shape within it, such as for use with multi-channel applications (see below). Liquid crystal injection port 34 provides an opening in seal pattern 33 for injecting liquid crystal material 35. End seal 36 seals injection port 34

Figure 3:
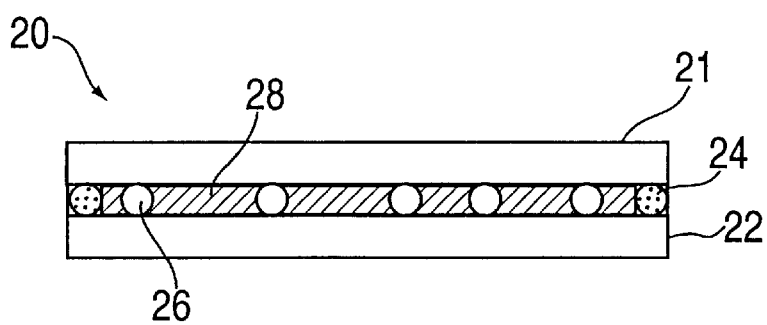
FIG. 3 is a side cross-section of yet another conventional LCD including a spacer.

LCD 30 also includes dummy seal pattern 37. Dummy seal pattern 37 includes a plurality of discontinuous seal portions 38. Thus, dummy seal pattern 37 does not completely isolate seal pattern 33 from active area 31, and thus may permit some fluid communication therethrough. Dummy seal pattern 37 can include a single line (e.g., a circle, a box, a curve, etc.) of discontinuous seal portions or multiple lines of discontinuous seal portions, as shown in FIG. 4. Alternatively, these seal portions can be disposed randomly in any desirable pattern. The seal portions can also have the same or varying sizes, shapes, and orientations. The material used to form dummy seal pattern 37 can include spacer particles, like those shown in FIG. 3 to help maintain a uniform gap between the front and back substrates. In an case, any individual seal portion does not substantially enclose any given active area.

Although dummy seal pattern 37 is not within active area 31, seal 33 improves the structural integrity of LCD 30 and facilitates sufficiently uniform and proper distribution of liquid crystal material 35, even while maintaining the physical dimensions of LCD 10. Dummy seal pattern 37 also prevents end seal 36 from bleeding into the interior of seal pattern 33, possibly contaminating active area 31. Furthermore, dummy seal pattern 37 helps to ensure that a uniform gap is formed between the two substrates when dummy seal pattern 37 is appropriately configured (e.g., an appropriate width, orientation, and spacing is selected).

Figure 7:
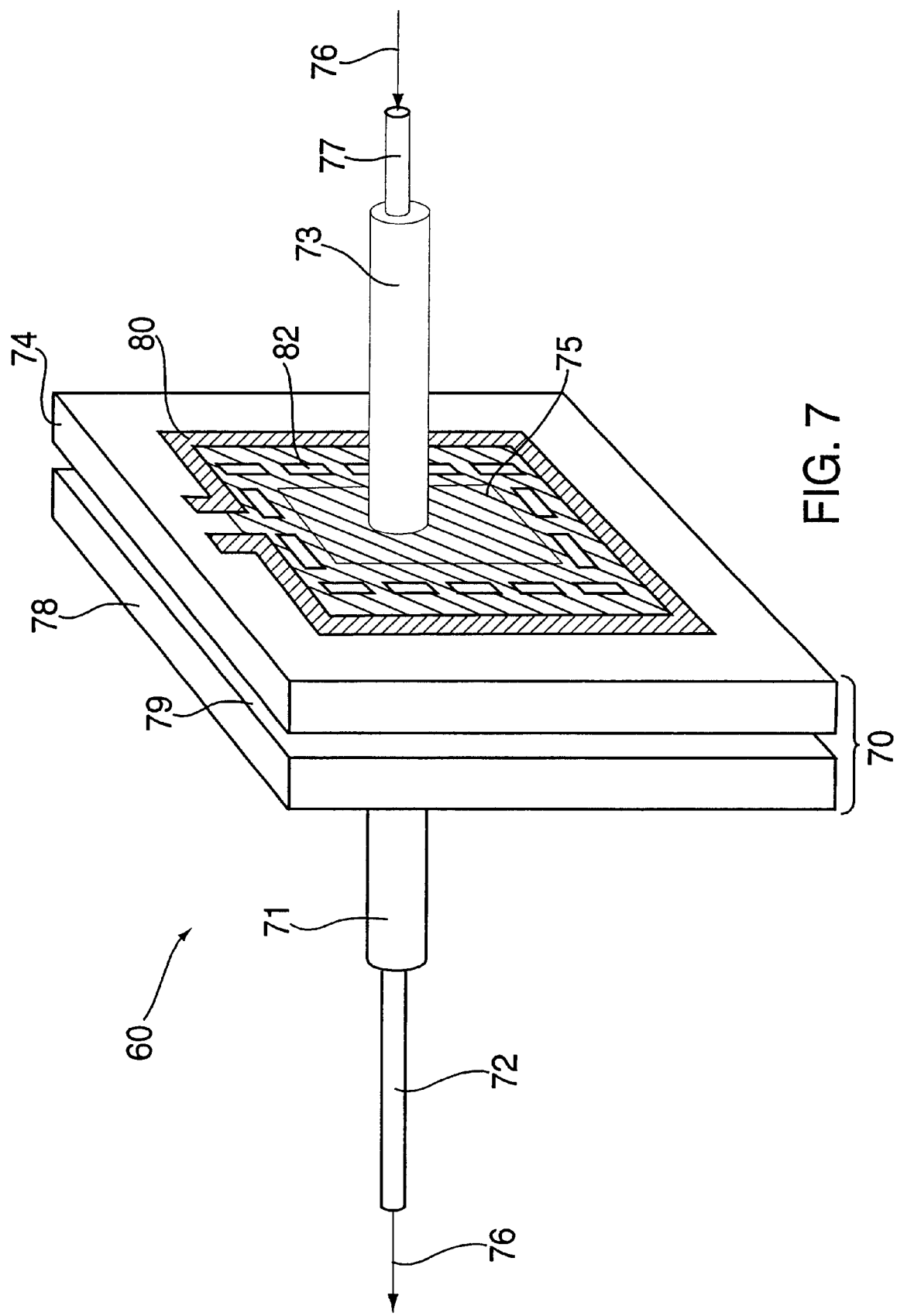
FIG. 7 is a perspective view of a fiber optic device, which includes an LCD, constructed according to this invention.

It will be appreciated that dummy seal pattern 37 can extend within active area 35, as long as dummy seal pattern 37 is not positioned along an optical path. As explained more fully below, an optical path is the principle axis of a beam of light delivered by an optical fiber. As shown in FIG. 7, the beam of light can be collimated with one or more optical components (e.g., lenses) before the light passes through LCD 30.

Seal pattern 33, end seal 36, and dummy seal pattern 37 are preferably formed with a predetermined height that corresponds to the gap between the upper and lower substrates. Seal pattern 33, end seal 36, and dummy seal pattern 37 are also preferably formed from an adhesive insulating epoxy or another appropriate bonding material. The width, orientation, and spacing of dummy seal pattern 37 can, for example, be controlled using the same techniques currently used for controlling the formation of seal pattern 33.

Figure 1:
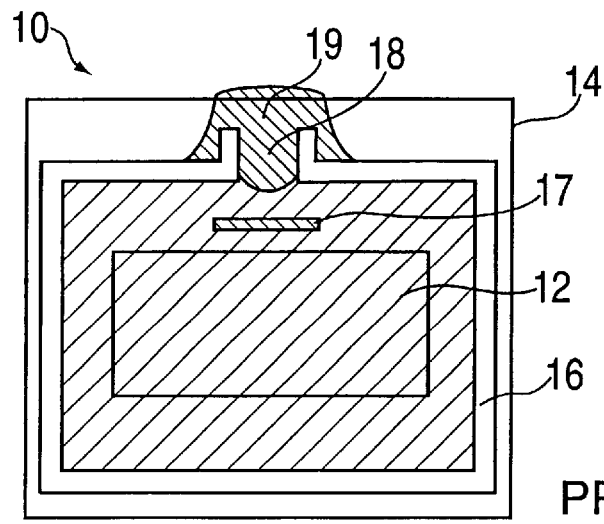
FIG. 1 is a plan view of a conventional seal pattern of an LCD.
Figure 2:
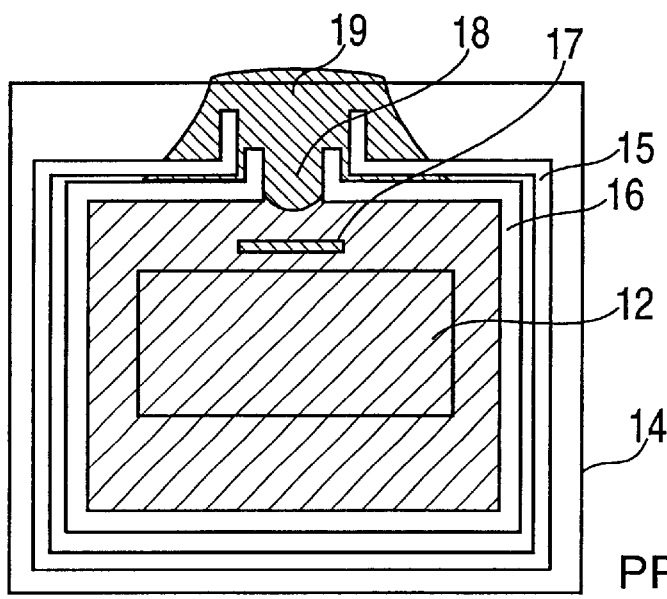
FIG. 2 is a plan view of another conventional seal pattern of an LCD.

LCD 30 is stronger than LCD 10 (shown in FIG. 1) because dummy seal pattern 37 increases the total amount of bonding area between the two opposing substrates without the attendant problems of constructing and maintaining a full double seal. Furthermore, because dummy seal pattern 37 includes a plurality of discontinuous seal portions, the reduced size of these portions compared with a full continuous seal makes dummy seal pattern 37 more resilient to bending and stress. This helps to absorb some the stress that is normally applied on primary seal pattern 33 during construction and use of the LCD. Thus, while dummy seal pattern 37 does not provide a conventional backup seal, dummy seal pattern 37 still protects seal pattern 33 by adding additional structural support. Dummy seal pattern 37 also helps to maintain a uniform cell gap without requiring spacers in the optical path within the active area of the cell, as shown LCD 20.

The use of a dummy seal pattern is particularly advantageous when used in an LCD having a large active area and/or an array of active areas. First, it is difficult to construct a large active area because, without distributing spacer particles, the substrates normally bow or warp. This warping usually destroys the uniform gap that is required in all high quality LCDs. The use of a dummy seal pattern, however, ensures the formation of a uniform gap by providing a plurality discontinuous support structures. Second, when an array of active areas is required, adjacent active areas can share the same dummy seal pattern portions. That is, each active area does not necessarily require its own separate dummy seal pattern.

Figure 5:
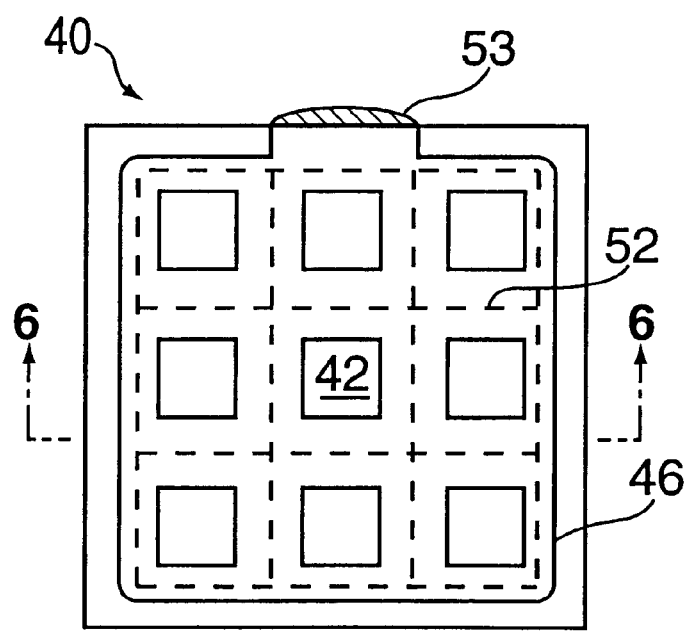
FIG. 5 is a plan view of an array of active areas in an LCD having a seal pattern according to the present invention.

For example, FIG. 5 shows LCD 40, which includes an array of active subareas 42. In LCD 40, each active subarea 42 does not require separate dummy seal patterns 52; adjacent active subareas 42 can share one or more portions of dummy seal pattern 52. Moreover, dummy seal pattern 52 provides fluid communication and pressure equalization between adjacent active subareas 42. Preferably, the distance between dummy seal pattern 52 and active subareas 42 is substantially the same for all dummy seal pattern/active subarea combinations. End seal 53 seals the injection port.

It will be appreciated that each of subareas 42 can be used for an individual channel of a multi-channel (e.g., multi-wavelength) system. For example, when a single optical fiber carries multiple beams of light, the beams can be demultiplexed and individually sent through different subareas of the same LCD. This allows a single LCD to act as a variable retarder for a number of channels simultaneously.

Figure 6:
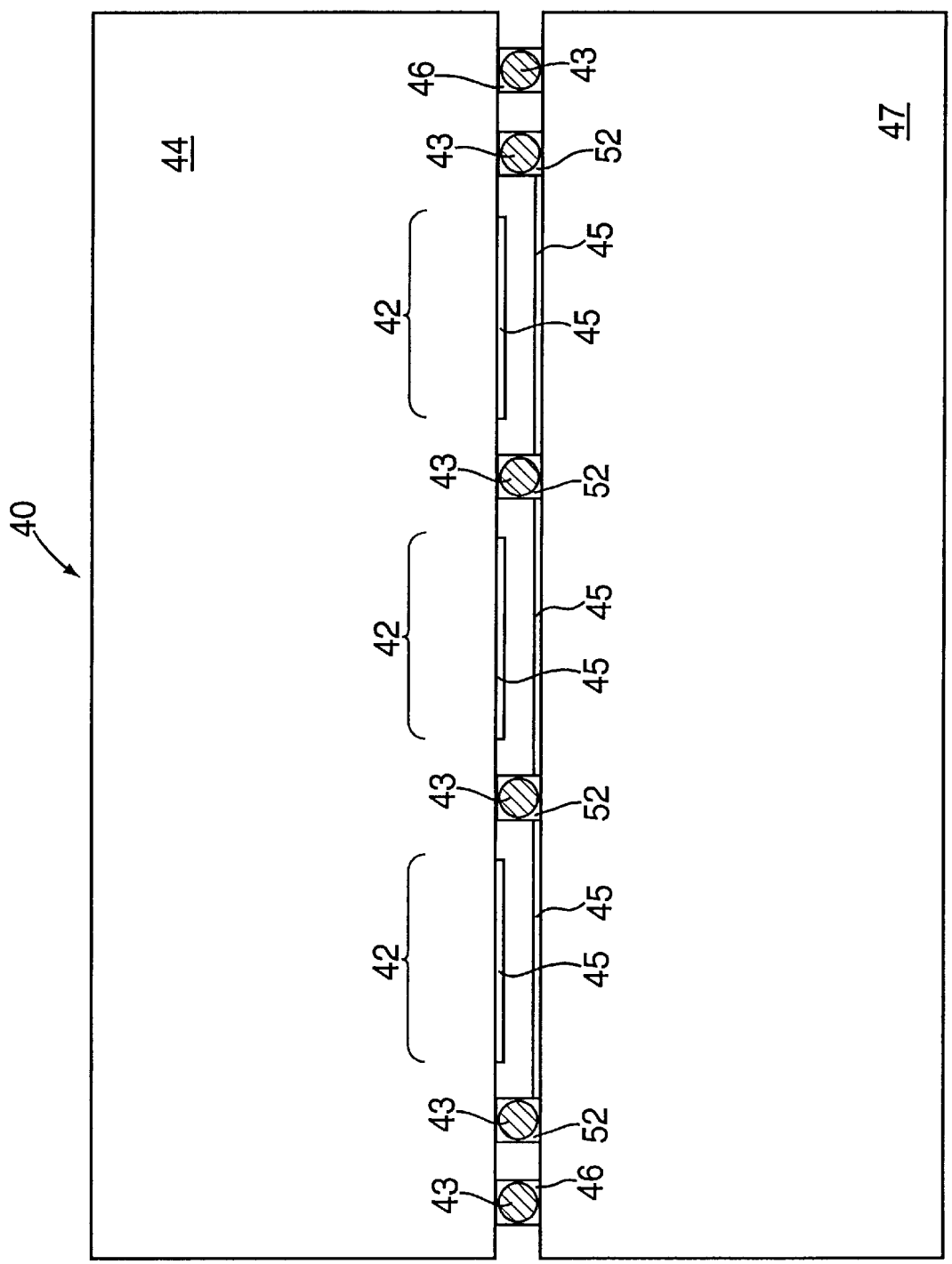
FIG. 6 is a side cross-section of the array shown in FIG. 5 according to the present invention, taken from line 6—6 of FIG. 5.

FIG. 6 shows a cross-sectional view of LCD 40 along line 6—6 of FIG. 5. Opposed transparent electrodes 45 define active subareas 42. Liquid crystal material 48 is injected inside primary seal pattern 46. Electrodes 45 can be formed from any substantially conductive material, such as Indium-Tin oxide thin films. Dummy seal pattern 52 is disposed between adjacent active subareas 42. Primary seal pattern 46 and/or dummy seal pattern 52 can contain spacer particles 43 and can be disposed on one or both of substrates 44 and 47 during construction of LCD 40.

FIG. 7 shows a perspective view of illustrative fiber optic device 60 constructed according to this invention. Device 60 is a variable optical retarder/polarization controller, which includes at least LCD 70. LCD 70 includes the input region, which is aligned with active area 75 and provides an entry port for beam 76, which has a first polarization state. As shown in FIG. 7, beam 76 is delivered to the input region via optical fiber 77 and collimator 73, which can be attached to an outer surface of substrate 74. When device 60 is a variable retarder, collimator 73 can be a gradient-index lens with a flat contact surface for improved temperature and optical performance and mechanical stability. LCD 70 also includes substrate 78, which is attached to and spaced from substrate 74 to form gap 79. Gap 79 is made uniform by primary seal pattern 80 and dummy seal pattern 82, which may contain spacers.

Active area 75 is defined by electrically controlled and substantially transparent electrodes (not shown), which are disposed on one or both of the inner surfaces of substrates 74 and 78 before being attached to each other.

Primary seal pattern 80 is located between substrates 74 and 78 and substantially circumscribes active area 75. During construction, a liquid crystal material is injected inside primary seal pattern 80. Dummy seal pattern 82 is formed at least partially inside primary seal pattern 80. In this case, dummy seal pattern 82 is placed entirely inside primary seal pattern 80 and substantially circumscribes active area 75. As already described above and shown in FIG. 7, dummy seal pattern 82 includes a plurality of discontinuous seal portions. In accordance with this invention, the input region does not overlap with any portion of dummy seal pattern 82. The output region (not shown in the perspective drawing) of controller 60 (is directly opposite the input region and provides an exit port (not shown) for beam 76 (which has a second polarization state after evolving through the liquid crystal material). As shown in FIG. 7, after beam 76 exits LCD 70, it is directed to collimator 71, which feeds beam 76 into optical fiber 72. Like collimator 73, collimator 71 can be attached to the outer surface of a substrate 71.

Thus it is seen that by using a dummy seal pattern in a LCD, one or more clear optical paths through the LCD can be formed while maintaining a uniform gap between the substrates. This is especially advantageous when the LCD is part of a fiber optic device. One skilled in the art will appreciate that the present invention can be practiced by other than the described embodiments, which are presented for purposes of illustration and not of limitation. For example, a dummy seal pattern need not have the same outline as the seal pattern, but can have any configuration that avoids the optical path in the active area and increases the structural integrity of the LCD (e.g., a circular configuration). It will be further appreciated that the present invention is limited only by the claims that follow.

What is claimed is:

1. A seal pattern formed on at least one substrate of a liquid crystal device having at least one active area, said seal pattern comprising:
   a primary seal pattern that substantially surrounds the at least one active area; and
   a double wall patterned dummy seal formed within the primary seal pattern, each wall of the double wall patterned dummy seal comprising a plurality of discontinuous seal portions.

2. The seal pattern of claim 1 wherein said at least one active area is a plurality of active areas, wherein said primary seal pattern substantially encloses all of said plurality of active areas, and said double wall patterned dummy seal is disposed at least partially between adjacent active areas.

3. The seal pattern of claim 1 wherein said primary seal pattern includes a liquid crystal injection port, wherein said seal pattern comprises an end seal for sealing said liquid crystal injection port, and wherein at least a portion of the double wall patterned dummy seal is positioned near said port to prevent said end seal from contaminating the active area.

4. The seal pattern of claim 1 wherein said double wall patterned dummy seal is formed with a shape that is substantially similar to the primary seal pattern, without regard to said liquid crystal injection port.

5. The seal pattern of claim 2 wherein said double wall patterned dummy seal is located between said adjacent active areas.

6. The seal pattern of claim 5 wherein substantially all portions of the double wall patterned dummy seal are positioned at approximately the same distance between adjacent active areas.

7. A liquid crystal device comprising:
   a pair of spaced substrates having at least one active area defined there between;
   a primary seal pattern between the pair of substrates that substantially circumscribes the active area;
   a liquid crystal material located in said primary seal pattern; and
   a dummy seal pattern formed at least partially inside said primary seal pattern and substantially around the active area, said dummy seal pattern comprising a parallel, double wall structure, wherein each wall in the parallel, double wall structure comprises a plurality of discontinuous seal portions.

8. The liquid crystal device of claim 7 wherein said at least one active area is a plurality of active areas, and wherein said primary seal pattern substantially encloses all of said plurality of active areas and said dummy seal pattern is disposed between adjacent active areas.

9. The liquid crystal device of claim 7 wherein said primary seal pattern includes a liquid crystal injection port, and wherein said seal pattern comprises an end seal for sealing said liquid crystal injection port, wherein at least one of said seal portions is positioned near said port to prevent said end seal from contaminating the active area.

10. The liquid crystal device of claim 7 wherein said plurality of discontinuous seal portions form a shape that is substantially similar to the primary seal pattern, without regard to said liquid crystal injection port.

11. The liquid crystal device of claim 7 wherein said liquid crystal device has a plurality of active areas, and wherein said dummy seal pattern is located between said adjacent active areas.

12. The liquid crystal device of claim 11 wherein said dummy seal pattern is located between all adjacent active areas.

13. The liquid crystal device of claim 11 wherein said dummy seal pattern is substantially evenly distributed between all adjacent active areas.

14. The liquid crystal device of claim 7 wherein said dummy seal pattern comprises at least two substantially parallel rows, each of said rows comprising a plurality of discontinuous seal portions.

15. A fiber optic apparatus comprising:
   a liquid crystal device located in an optical path of a beam of light, said device comprising: a pair of spaced substrates forming a substantially uniform gap there between, each of said substrates having at least one electrically controlled electrode disposed thereon and overlapping with the other electrode, a primary seal pattern between the pair of substrates that substantially circumscribes an active area of the device, a liquid crystal material between said spaced substrates and within said primary seal pattern, and a dummy seal pattern formed at least partially inside said primary seal pattern, said dummy seal pattern comprising a parallel, double wall structure, wherein each wall in the parallel, double wall structure comprises a plurality of discontinuous seal portions;

a first optical fiber for providing light to said active area of said device; and a second optical fiber for receiving light after evolving through said active area of said device.

16. The apparatus of claims 15 further comprising a first collimator between said input optical fiber and said device.

17. The apparatus of claim 15 further comprising a second collimator between said device and said output optical fiber.

18. The apparatus of claim 15 further comprising a voltage source for applying a potential difference between said electrodes to modify the polarization state of the light beam evolving through said liquid crystal material.

\* \* \* \* \*